US010854940B2

(12) United States Patent
Song et al.

(10) Patent No.: US 10,854,940 B2
(45) Date of Patent: Dec. 1, 2020

(54) WINDOW ASSEMBLY HAVING A COPLANAR WAVEGUIDE TO COPLANAR WAVEGUIDE COUPLER FOR RADIO FREQUENCY DEVICES

(71) Applicant: GM GLOBAL TECHNOLOGY OPERATIONS LLC, Detroit, MI (US)

(72) Inventors: Hyok Jae Song, Oak Park, CA (US); Timothy J. Talty, Beverly Hills, MI (US); James H. Schaffner, Chatsworth, CA (US); Duane S. Carper, Davison, MI (US); Eray Yasan, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 15/889,724

(22) Filed: Feb. 6, 2018

(65) Prior Publication Data

US 2019/0245256 A1 Aug. 8, 2019

(51) Int. Cl.

| | |
|---|---|
| *H01P 3/00* | (2006.01) |
| *E06B 3/66* | (2006.01) |
| *H01Q 1/12* | (2006.01) |
| *H01Q 1/48* | (2006.01) |
| *B32B 17/00* | (2006.01) |
| *B60J 1/00* | (2006.01) |
| *H01Q 1/32* | (2006.01) |

(52) U.S. Cl.
CPC ............ *H01P 3/003* (2013.01); *E06B 3/6608* (2013.01); *H01Q 1/12* (2013.01); *H01Q 1/48* (2013.01); *B32B 17/00* (2013.01); *B32B 2605/006* (2013.01); *B60J 1/00* (2013.01); *H01Q 1/325* (2013.01)

(58) Field of Classification Search
CPC ......... H01P 3/003; H01P 5/028; H01Q 1/325; H01Q 1/32; H01Q 1/1271
See application file for complete search history.

(56) References Cited

U.S. PATENT DOCUMENTS

| | | | |
|---|---|---|---|
| 5,355,144 A | 10/1994 | Walton et al. | |
| 5,363,114 A * | 11/1994 | Shoemaker | .......... H01Q 1/1271 343/713 |
| 5,528,314 A | 6/1996 | Nagy et al. | |

(Continued)

*Primary Examiner* — Dameon E Levi
*Assistant Examiner* — Jennifer F Hu
(74) *Attorney, Agent, or Firm* — Quinn IP Law

(57) ABSTRACT

A window assembly includes a first radio frequency device disposed between a first window substrate and a second window substrate. An embedded coplanar waveguide is disposed between the first window substrate and the second window substrate, and is attached to the first radio frequency device. An exterior coplanar waveguide is disposed adjacent an exterior side surface of the first window substrate, and is disposed opposite the embedded coplanar waveguide for communicating electromagnetic waves therebetween. A printed circuit board is attached to and interconnects the exterior coplanar waveguide and a radio frequency cable connector. The radio frequency cable connector is configured for connection to a second radio frequency device. An adhesive layer bonds the printed circuit board to the exterior side surface of the first window substrate.

17 Claims, 3 Drawing Sheets

(56) References Cited

U.S. PATENT DOCUMENTS

| | | | | |
|---|---|---|---|---|
| 6,020,855 A * | 2/2000 | Nagy | ................ | B32B 17/10036 |
| | | | | 343/711 |
| 7,119,751 B2 * | 10/2006 | Li | ........................ | H01Q 1/1271 |
| | | | | 343/713 |
| 7,319,800 B2 * | 1/2008 | Aoki | ..................... | G02F 1/0356 |
| | | | | 385/2 |
| 2003/0214364 A1 * | 11/2003 | Cites | ........................ | H01P 5/08 |
| | | | | 333/33 |
| 2011/0121924 A1 * | 5/2011 | White | ..................... | H01P 5/085 |
| | | | | 333/260 |
| 2011/0241803 A1 * | 10/2011 | Tsukashima | ............ | H01P 3/003 |
| | | | | 333/238 |
| 2012/0294563 A1 * | 11/2012 | Thomson | ................ | G02F 1/015 |
| | | | | 385/2 |
| 2017/0237139 A1 * | 8/2017 | Talty | ....................... | H01P 3/003 |
| | | | | 333/239 |

* cited by examiner

WINDOW ASSEMBLY HAVING A COPLANAR WAVEGUIDE TO COPLANAR WAVEGUIDE COUPLER FOR RADIO FREQUENCY DEVICES

INTRODUCTION

The disclosure generally relates to a window assembly.

Some laminate window assemblies may include an embedded radio frequency device, such as but not limited to an antenna, disposed between two glass substrates. The embedded radio frequency device must be coupled to other devices that are not embedded between the two glass substrates, i.e., that are located remotely from or on the exterior of the laminate window assembly, in order to communicate signals therebetween.

SUMMARY

A window assembly is provided. The window assembly includes a first window substrate, and a second window substrate. The first window substrate has a first side surface and a second side surface. The second window substrate has a first side surface and a second side surface. The first side surface of the first window substrate faces the first side surface of the second window substrate. A first radio frequency device is disposed between the first window substrate and the second window substrate. An embedded coplanar waveguide is disposed between the first window substrate and the second window substrate. The embedded coplanar waveguide is attached to the first radio frequency device. An exterior coplanar waveguide is disposed adjacent the second side surface of the first window substrate, and is disposed opposite the embedded coplanar waveguide for communicating electromagnetic waves therebetween.

In one embodiment of the window assembly, each of the first window substrate and the second window substrate are glass substrates.

In one aspect of the window assembly, the first radio frequency device includes a radio frequency antenna.

In one embodiment of the window assembly, a printed circuit board is attached to and interconnects the exterior coplanar waveguide and a radio frequency cable connector. The radio frequency cable connector is attached to the exterior coplanar waveguide, and is configured for connection to a second radio frequency device. An adhesive layer may be used to bond the printed circuit board to the second side surface of the first window substrate.

In one aspect of the window assembly, each of the embedded coplanar waveguide and the exterior coplanar waveguide include a respective first ground plane portion, a respective central conductor portion, and a respective second ground plane portion. The respective first ground plane portions and the respective central conductor portions are separated by a respective first gap. The respective second ground plane portions and the respective central conductor portions are separated by a respective second gap.

In another aspect of the window assembly, each respective central conductor portion includes a body portion having a planar rectangular shape, and an end portion having a planar isosceles trapezoidal shape. Each respective first ground plane portion includes a body portion having a planar rectangular shape, and an end portion having a planar trapezoidal shape. Each respective second ground plane portion includes a body portion having a planar rectangular shape, and an end portion having a planar trapezoidal shape. The end portion of the central conductor portion of the embedded coplanar waveguide includes an edge that is aligned along a first transverse reference line. The first transverse reference line is perpendicular to a central longitudinal axis. The end portion of the first ground plane portion of the embedded coplanar waveguide includes an edge that is aligned along the first transverse reference line. Similarly, the end portion of the second ground plane portion of the embedded coplanar waveguide includes an edge aligned along the first transverse reference line. The end portion of the central conductor portion of the exterior coplanar waveguide includes an edge that is aligned along a second transverse reference line. The second transverse reference line is perpendicular to the central longitudinal axis, and is spaced apart from the first transverse reference line along the longitudinal axis by a coupled region length. The end portion of the first ground plane portion of the exterior coplanar waveguide includes an edge that is aligned along the second transverse reference line. The end portion of the second ground plane portion of the exterior coplanar waveguide includes an edge that is aligned along the second transverse reference line.

In another aspect of the window assembly, each respective central conductor portion includes a conductor width. In one embodiment, the conductor width of each respective central conductor portion is substantially equal to a length of a highest design frequency wavelength in glass, divided by four.

In another aspect of the window assembly, each respective first gap includes a first gap width, and each respective second gap includes a second gap width. The first gap width is different from the second gap width. More particularly, the first gap width is less than the second gap width. In one embodiment, the first gap width is less than the conductor width.

In another aspect of the window assembly, each of the embedded coplanar waveguide and the exterior coplanar waveguide include a coupled region length, which is measured along the longitudinal axis between the first transverse reference line and the second transverse reference line. In one embodiment, the coupled region length of each of the embedded coplanar waveguide and the exterior coplanar waveguide is substantially equal to a length of a highest design frequency wavelength in glass, divided by two.

Accordingly, the embedded coplanar waveguide and the exterior coplanar waveguide are electromagnetically coupled to communicate radio waves therebetween, through the first window substrate. This electromagnetic coupling between the embedded coplanar waveguide and the exterior coplanar waveguide enable the communication of electromagnetic radio waves through the first window substrate, without a direct physical connection. This enables radio frequency devices embedded between the first window substrate and the second window substrate to communicate with exterior radio frequency devices not embedded within the window assembly, without a direct physical connection. For example, a radio frequency cable connector may be attached to the exterior coplanar waveguide for connection to a second radio frequency device, such as a radio transmitter/receiver. In the exemplary embodiment, the first radio frequency device may include an antenna. The electromagnetic coupling between the embedded coplanar waveguide and the exterior coplanar waveguide communicate electromagnetic radio wave signals between the radio transmitter/receiver and the embedded antenna, without a direct physical connection therebetween.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a window assembly is generally shown at 20. In some embodiments, the window assembly 20 may be incorporated into a vehicle, such as a windshield, side window, or rear window of a car, truck, bus, train, plane, boat, tractor, ATV, etc. In other embodiments, the window assembly 20 may be incorporated into a stationary structure, such as a building window.

Figure 1:
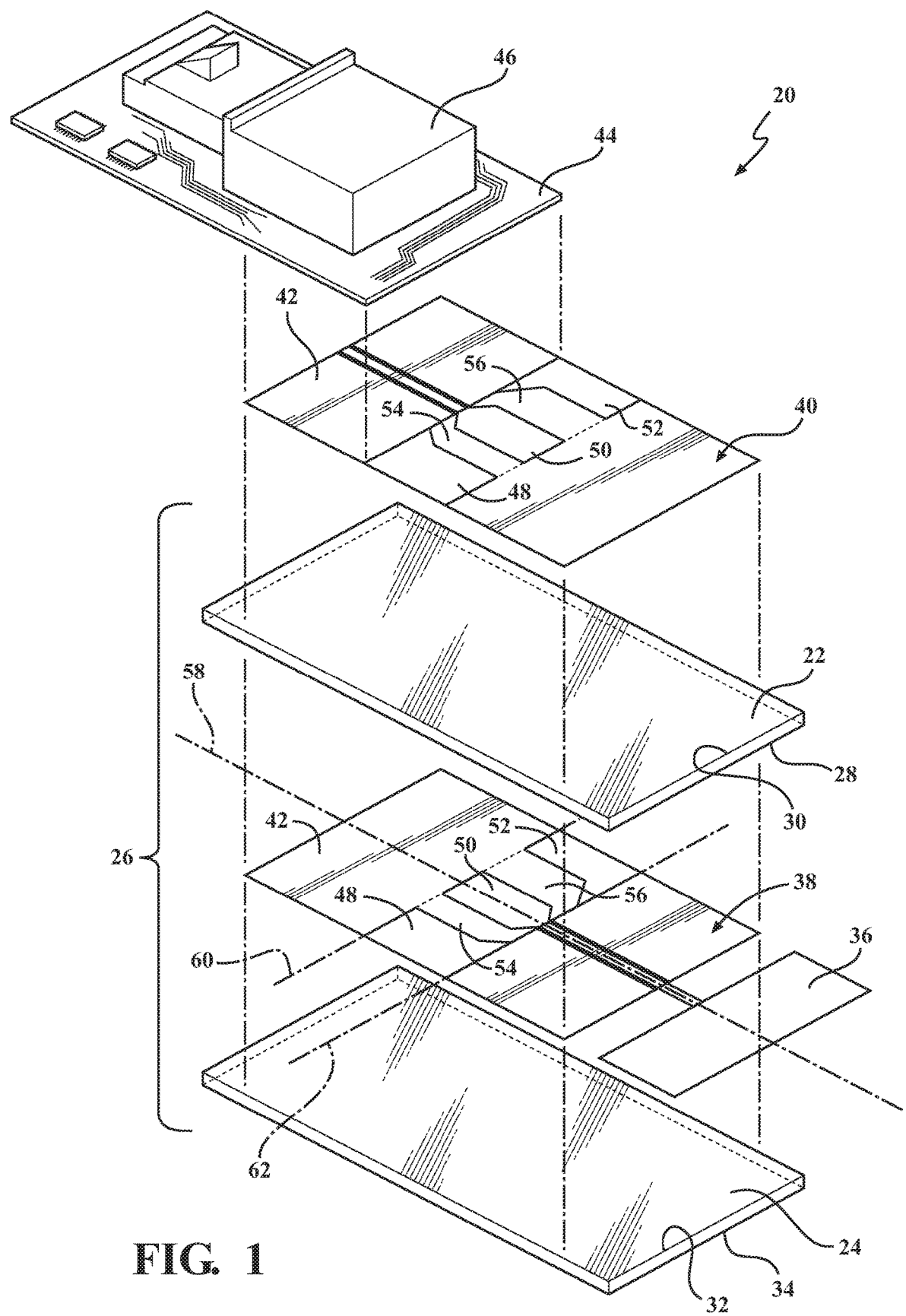
FIG. 1 is a schematic exploded perspective view of a window assembly.
Figure 2:
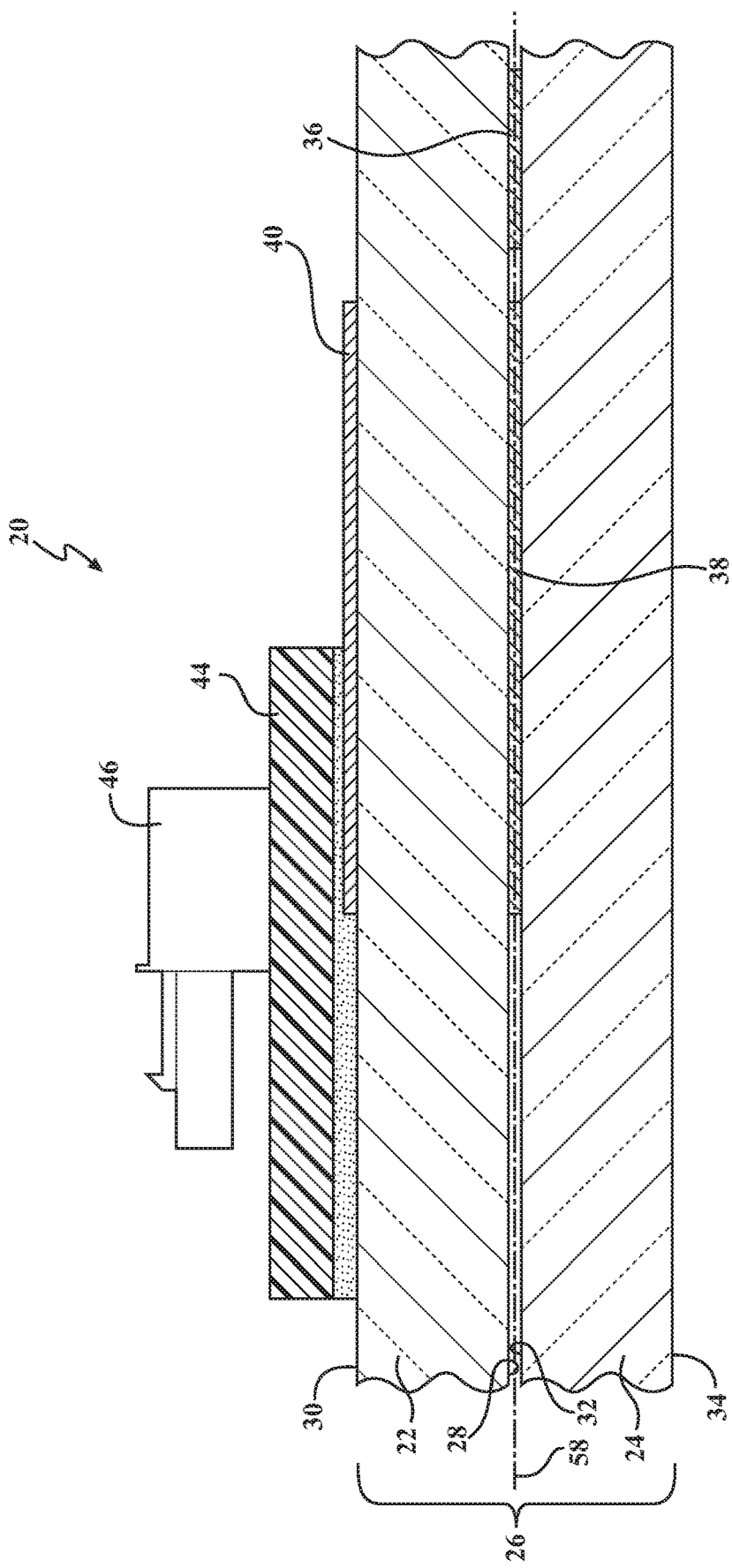
FIG. 2 is a schematic side cross sectional view of the window assembly.

Referring to FIGS. 1 and 2, the window assembly 20 includes a first window substrate 22 and a second window substrate 24, laminated together to define a laminated structure 26. In the exemplary embodiment described herein, the first window substrate 22 and the second window substrate 24 are glass substrates. However, in other embodiments, the first window substrate 22 and the second window substrate 24 may be manufactured from some other transparent material.

The first window substrate 22 includes a first side surface 28 and a second side surface 30. Similarly, the second window substrate 24 includes a first side surface 32 and a second side surface 34. The first side surface 28 of the first window substrate 22 is disposed opposite and faces the first side surface 32 of the second window substrate 24. Accordingly, the first side surface 28 of the first window substrate 22 and the first side surface 32 of the second window substrate 24 may be considered internal surfaces of the laminated structure 26. The second side surface 30 of the first window substrate 22 and the second side surface 34 of the second window substrate 24 each face outward, away from the laminated structure 26. Accordingly, the second side surface 30 of the first window substrate 22 and the second side surface 34 of the second window substrate 24 may be considered external surfaces of the laminated structure 26.

As best shown in FIG. 1, the window assembly 20 includes a first radio frequency device 36, which is disposed between the first side surface 28 of the first window substrate 22, and the first side surface 32 of the second window substrate 24. The first radio frequency device 36 may include a thin, planar structure used in transmitting and/or receiving radio frequency waves. For example, the first radio frequency device 36 may include, but is not limited to, a radio frequency antenna.

Referring to FIGS. 1 and 2, the window assembly 20 further includes an embedded coplanar waveguide 38, and an exterior coplanar waveguide 40. The embedded coplanar waveguide 38 and the exterior coplanar waveguide 40 are each coplanar waveguides. As generally understood by those skilled in the art, a coplanar waveguide is a structure in which all conductors supporting wave propagation are located on the same plane, i.e., generally on top of a dielectric substrate 42. A coplanar waveguide includes a central conductor separated on each side from ground planes by two narrow gaps. The dielectric substrate 42 for each of the embedded coplanar waveguide 38 and the exterior coplanar waveguide 40 may include a suitable dielectric material. The dielectric material of the dielectric substrate of the embedded coplanar waveguide 38 and the exterior coplanar waveguide 40 may be the same dielectric material, or they may be different dielectric materials.

The embedded coplanar waveguide 38 is disposed between the first side surface 32 of the first window substrate 22, and the first side surface 32 of the second window substrate 24. As such, the embedded coplanar waveguide 38 is embedded or sandwiched between the first window substrate 22 and the second window substrate 24. The embedded coplanar waveguide 38 is directly attached to the first radio frequency device 36. As such, the embedded coplanar waveguide 38 and the first radio frequency device 36 are physically connected together for communication therebetween. The exterior coplanar waveguide 40 is disposed adjacent the second side surface 30 of the first window substrate 22. Accordingly, the exterior coplanar waveguide 40 is disposed on an exterior of the laminated structure 26. The exterior coplanar waveguide 40 is disposed directly opposite the embedded coplanar waveguide 38 for communicating electromagnetic waves therebetween. The exterior coplanar waveguide 40 is not directly connected to the embedded coplanar waveguide 38.

In the exemplary embodiment shown in the Figures and described herein, a printed circuit board 44 (PCB) is attached to and interconnects the exterior coplanar waveguide 40 and a connector 46. In the exemplary embodiment described herein, the connector 46 is a radio frequency cable connector 46, such as but not limited to, a FAKRA type connector 46. However, in other embodiments, the connector 46 may include some other type of connector not specifically shown or described herein. The exterior coplanar waveguide 40 may be attached to the printed circuit board 44 in a suitable manner. For example, the exterior coplanar waveguide 40 may be an integral part of the printed circuit board 44, or may be connected to the printed circuit board 44 through one or more electrical connecting elements. Additionally, the connector 46 may be attached to the printed circuit board 44 in a suitable manner. For example, the connector 46 may be affixed or soldered to the printed circuit board 44, or may be indirectly connected to the circuit board through one or more electrical connecting elements.

The printed circuit board 44 may be attached to the second side surface 30 of the first window substrate 22 in a suitable manner. For example, the window assembly 20 may include an adhesive layer directly bonding the printed circuit board 44 to the second side surface 30 of the first window substrate 22. In other embodiments, a metal bonding pad (not shown) may be affixed to the second side surface 30 of the first window substrate 22, and the printed circuit board 44 attached to the metal bonding pad. It should be appreciated that the printed circuit board 44 may be attached to the second side surface 30 of the first window substrate 22 in some other manner not specifically described herein.

As noted above, in the exemplary embodiment described herein, the connector 46 includes the radio frequency cable connector 46. The radio frequency cable connector 46 is attached to the exterior coplanar waveguide 40. In the exemplary embodiment described herein, the printed circuit board 44 is used to connect the radio frequency cable connector 46 to the exterior coplanar waveguide 40. However, in other embodiments, the radio frequency cable connector 46 may be directly connected to the exterior coplanar waveguide 40 without the use of the printed circuit board 44. The radio frequency cable connector 46 is configured for connection to a second radio frequency device (not shown). The second radio frequency device may include, but is not limited to, a transmitting and/or receiving radio device, a GPS device, a Wi-Fi device, a satellite radio device, a satellite communication device, etc.

The embedded coplanar waveguide 38 and the exterior coplanar waveguide 40 communicate electromagnetic radio frequency waves therebetween, even though they are not directly connected to each other for communication therebetween. As such, the combination of the embedded coplanar waveguide 38 and the exterior coplanar waveguide 40 enable the first radio frequency device 36 and the second radio frequency device to be connected to each other for communication therebetween, without a direct physical connection. This arrangement eliminates the need to pass a connecting wire or other similar electrical connecting element through a hole or passage in the first window substrate 22, or alternatively route an electrical connecting element through an edge 86 of the laminated structure 26. Additionally, the printed circuit board 44 may include one or more other radio frequency devices, such as but not limited to, a low noise amplifier or a power amplifier, which may also be connected to the first radio frequency device through the signal communication between the embedded coplanar waveguide 38 and the exterior coplanar waveguide 40.

Figure 3:
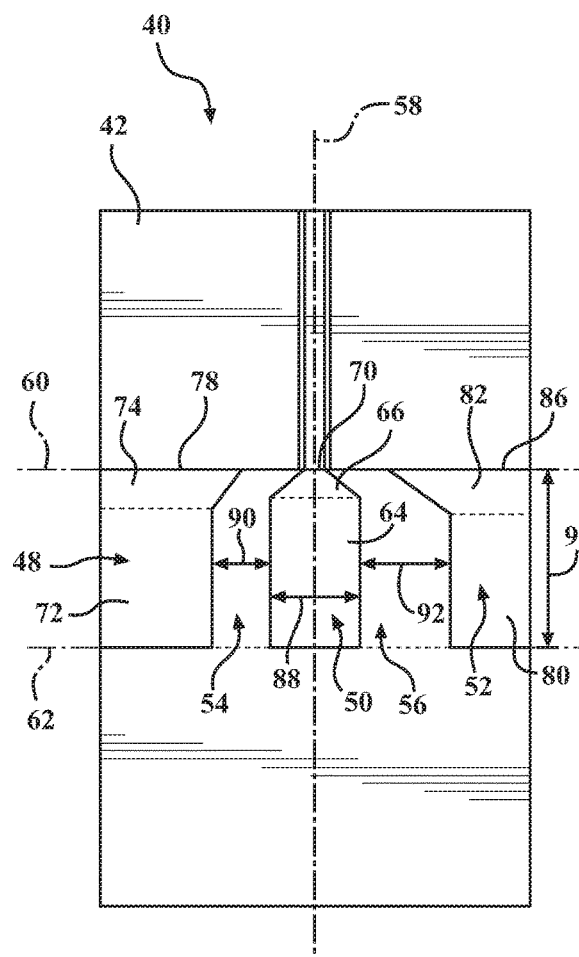
FIG. 3 is a schematic top plan view of an exterior coplanar waveguide of the window assembly.
Figure 4:
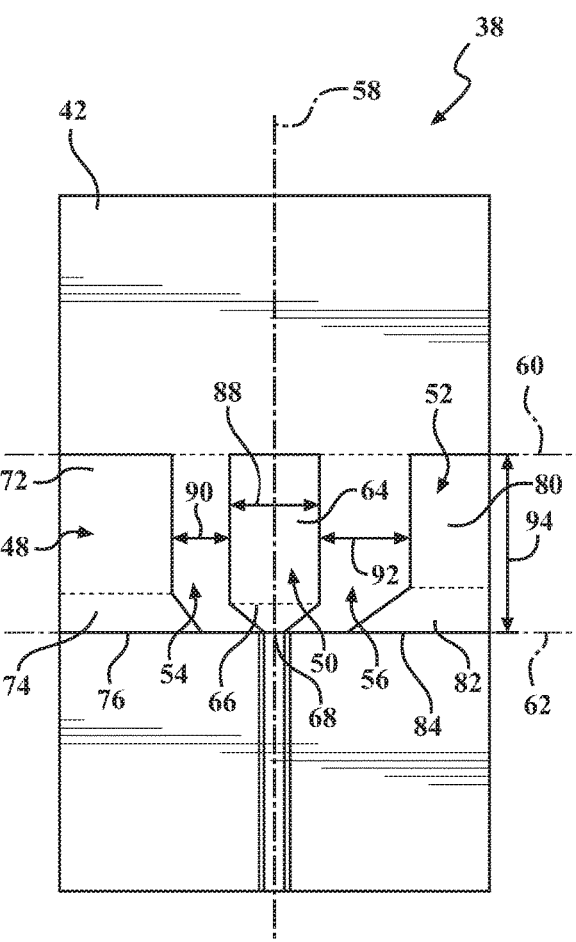
FIG. 4 is a schematic top plan view of an embedded coplanar waveguide of the window assembly.

Referring to FIGS. 3 and 4, in which the exterior coplanar waveguide 40 is shown in FIG. 3 and the embedded coplanar waveguide 38 is shown in FIG. 4, each of the embedded coplanar waveguide 38 and the exterior coplanar waveguide 40 include a respective first ground plane portion 48, a respective central conductor portion 50, and a respective second ground plane portion 52. The respective first ground plane portions 48 and the respective central conductor portions 50 of the embedded coplanar waveguide 38 and the exterior coplanar waveguide 40 are separated by a respective first gap 54. The respective second ground plane portions 52 and the respective central conductor portions 50 of the embedded coplanar waveguide 38 and the exterior coplanar waveguide 40 are separated by a respective second gap 56.

The embedded coplanar waveguide 38 and the exterior coplanar waveguide 40 are arranged relative to each other along a longitudinal axis 58 of the laminated structure 30. The longitudinal axis 58 extends along a longitudinal center of each of the embedded coplanar waveguide 38 and the exterior coplanar waveguide 40. A first transverse reference line 60 is disposed perpendicular to the longitudinal axis 58. Additionally, a second transverse reference line 62 is disposed perpendicular to the longitudinal axis 58. The first transverse reference line 60 and the second transverse reference line 62 are parallel with each other, and spaced apart from each other along the longitudinal axis 58 a coupled region length 94.

Each respective central conductor portion 50 of the embedded coplanar waveguide 38 and the exterior coplanar waveguide 40 includes a body portion 64 having a planar rectangular shape, and an end portion 66 having a planar isosceles trapezoidal shape. As shown in FIG. 4, the end portion 66 of the central conductor portion 50 of the embedded coplanar waveguide 38 includes an edge 68 aligned along the second transverse reference line 62. As shown in FIG. 3, the end portion 66 of the central conductor portion 50 of the exterior coplanar waveguide 40 includes an edge 70 aligned along the first transverse reference line 60.

Each respective first ground plane portion 48 of the embedded coplanar waveguide 38 and the exterior coplanar waveguide 40 includes a body portion 72 having a planar rectangular shape, and an end portion 74 having a planar trapezoidal shape. As shown in FIG. 4, the end portion 74 of the first ground plane portion 48 of the embedded coplanar waveguide 38 includes an edge 76 aligned along the second transverse reference line 62. As shown in FIG. 3, the end portion 74 of the first ground plane portion 48 of the exterior coplanar waveguide 40 includes an edge 78 aligned along the first transverse reference line 60.

Each respective second ground plane portion 52 of the embedded coplanar waveguide 38 and the exterior coplanar waveguide 40 includes a body portion 80 having a planar rectangular shape, and an end portion 82 having a planar trapezoidal shape. As shown in FIG. 4, the end portion 82 of the second ground plane portion 52 of the embedded coplanar waveguide 38 includes an edge 84 aligned along the second transverse reference line 62. As shown in FIG. 3, the end portion 82 of the second ground plane portion 52 of the exterior coplanar waveguide 40 includes an edge 86 aligned along the first transverse reference line 60.

Referring to FIG. 1, the central conductor portion 50 of the embedded coplanar waveguide 38 and the central conductor portion 50 of the exterior coplanar waveguide 40 are disposed opposite each other, across the first window substrate 22 from each other. However, referring also to FIG. 4, the trapezoidal shaped end portion 66 of the central conductor portion 50 of the embedded coplanar waveguide 38 is disposed adjacent the second transverse reference line 62, whereas, referring also to FIG. 3, the trapezoidal shaped end portion 66 of the central conductor portion 50 of the exterior coplanar waveguide 40 is disposed adjacent the first transverse reference line 60.

Referring to FIG. 1, the first ground plane portion 48 of the embedded coplanar waveguide 38 and the first ground plane portion 48 of the exterior coplanar waveguide 40 are disposed opposite each other, across the first window substrate 22 from each other. However, referring also to FIG. 4, the trapezoidal shaped end portion 74 of the first ground plane portion 48 of the embedded coplanar waveguide 38 is disposed adjacent the second transverse reference line 62, whereas, referring also to FIG. 3, the trapezoidal shaped end portion 74 of the first ground plane portion 48 of the exterior coplanar waveguide 40 is disposed adjacent the first transverse reference line 60.

Referring to FIG. 1, the second ground plane portion 52 of the embedded coplanar waveguide 38 and the second ground plane portion 52 of the exterior coplanar waveguide 40 are disposed opposite each other, across the first window substrate 22 from each other. However, referring also to FIG. 4, the trapezoidal shaped end portion 82 of the second ground plane portion 52 of the embedded coplanar waveguide 38 is disposed adjacent the second transverse reference line 62, whereas, referring also to FIG. 3, the trapezoidal shaped end portion 82 of the second ground plane portion 52 of the exterior coplanar waveguide 40 is disposed adjacent the first transverse reference line 60.

Referring to FIGS. 3 and 4, each respective central conductor portion 50 of the embedded coplanar waveguide 38 and the exterior coplanar waveguide 40 includes a conductor width 88. The conductor width 88 is measured across the body portion 64 of the respective central conductor portion 50, perpendicular to the longitudinal axis 58. In one exemplary embodiment, the conductor width 88 of each respective central conductor portion 50 is substantially equal to a length of a highest design frequency wavelength in glass, divided by four.

Referring to FIGS. 3 and 4, each respective first gap 54 of the embedded coplanar waveguide 38 and the exterior coplanar waveguide 40 includes a first gap width 90. The first gap width 90 is measured between the respective body portion 72 of the first ground plane portion 48 and the respective body portion 64 of the central conductor portion 50, perpendicular to the longitudinal axis 58. In one exemplary embodiment, the first gap width 90 is less than the conductor width 88. Each respective second gap 56 of the embedded coplanar waveguide 38 and the exterior coplanar waveguide 40 includes a second gap width 92. The second gap width 92 is measured between the respective body portion 80 of the second ground plane portion 52 and the respective body portion 64 of the central conductor portion 50, perpendicular to the longitudinal axis 58. The first gap width 90 is different from the second gap width 92, to form an asymmetrical coplanar waveguide. In the exemplary embodiment shown and described herein, the first gap width 90 is less than the second gap width 92. In other words, the second gap width 92 is greater than the first gap width 90. The difference between the first gap width 90 and the second gap width 92 may be established empirically. However, in one exemplary embodiment, the difference between the first gap width 90 and the second gap width 92 is between the range of 1.0 mm and 4.0 mm. More particularly, the difference between the first gap width 90 and the second gap width 92 is approximately equal to 2.0 mm.

Referring to FIGS. 3 and 4, each of the embedded coplanar waveguide 38 and the exterior coplanar waveguide 40 extend along the longitudinal axis 58 the coupled region length 94, which is measured along the longitudinal axis 58 between the first transverse reference line 60 and the second transverse reference line 62. In one embodiment, the coupled region length 94 of each of the embedded coplanar waveguide 38 and the exterior coplanar waveguide 40 is substantially equal to a length of a highest design frequency wavelength in glass, divided by two. The asymmetrical embedded coplanar waveguide 38 and the asymmetrical exterior coplanar waveguide 40 described herein cooperate together to provide radio wave communication therebetween over a wide band of radio wave frequencies, enabling the embedded coplanar waveguide 38 to exterior coplanar waveguide 40 coupler to communicate radio frequency signals therebetween, to connect the first radio frequency device 36 and the second radio frequency device.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A window assembly comprising:
   a first window substrate having a first side surface and a second side surface;
   a second window substrate having a first side surface and a second side surface, with the first side surface of the first window substrate facing the first side surface of the second window substrate;
   a first radio frequency device disposed between the first window substrate and the second window substrate;
   an embedded coplanar waveguide disposed between the first window substrate and the second window substrate, and attached to the first radio frequency device; and
   an exterior coplanar waveguide disposed adjacent the second side surface of the first window substrate, and disposed opposite the embedded coplanar waveguide for communicating electromagnetic waves therebetween;
   wherein each of the embedded coplanar waveguide and the exterior coplanar waveguide include a respective first ground plane portion, a respective central conductor portion, and a respective second ground plane portion, with the respective first ground plane portions and the respective central conductor portions separated by a respective first gap, and with the respective second ground plane portions and the respective central conductor portions separated by a respective second gap;
   wherein each of the embedded coplanar waveguide and the exterior coplanar waveguide include a coupled region length measured along a longitudinal axis between a first transverse reference line and a second transverse reference line; and
   wherein the coupled region length of each of the embedded coplanar waveguide and the exterior coplanar waveguide is substantially equal to a length of a highest design frequency wavelength in glass, divided by two.

2. The window assembly set forth in claim 1, wherein the first window substrate and the second window substrate are glass substrates.

3. The window assembly set forth in claim 1, wherein the first radio frequency device includes a radio frequency antenna.

4. The window assembly set forth in claim 1, further comprising a radio frequency cable connector attached to the exterior coplanar waveguide and configured for connection to a second radio frequency device.

5. The window assembly set forth in claim 4, further comprising a printed circuit board attached to and interconnecting the exterior coplanar waveguide and the radio frequency cable connector.

6. The window assembly set forth in claim 5, further comprising an adhesive layer bonding the printed circuit board to the second side surface of the first window substrate.

7. The window assembly set forth in claim 1, wherein each respective central conductor portion includes a body portion having a planar rectangular shape, and an end portion having a planar isosceles trapezoidal shape.

8. The window assembly set forth in claim 7, wherein each respective first ground plane portion includes a body portion having a planar rectangular shape, and an end portion having a planar trapezoidal shape.

9. The window assembly set forth in claim 8, wherein each respective second ground plane portion includes a body portion having a planar rectangular shape, and an end portion having a planar trapezoidal shape.

10. The window assembly set forth in claim 9, wherein:
the end portion of the central conductor portion of the exterior coplanar waveguide includes an edge aligned along a first transverse reference line that is perpendicular to the central longitudinal axis;
the end portion of the first ground plane portion of the exterior coplanar waveguide includes an edge aligned along the first transverse reference line; and
the end portion of the second ground plane portion of the exterior coplanar waveguide includes an edge aligned along the first transverse reference line.

11. The window assembly set forth in claim 9, wherein:
the end portion of the central conductor portion of the embedded coplanar waveguide includes an edge aligned along a second transverse reference line that is perpendicular to a central longitudinal axis;
the end portion of the first ground plane portion of the embedded coplanar waveguide includes an edge aligned along the second transverse reference line; and
the end portion of the second ground plane portion of the embedded coplanar waveguide includes an edge aligned along the second transverse reference line.

12. The window assembly set forth in claim 11, wherein the first transverse reference line and the second transverse reference line are parallel with each other, and spaced apart from each other along the central longitudinal axis.

13. The window assembly set forth in claim 1, wherein each respective first gap includes a first gap width, and wherein each respective second gap includes a second gap width, with the first gap width different from the second gap width.

14. The window assembly set forth in claim 13, wherein the first gap width is less than the second gap width.

15. The window assembly set forth in claim 1, wherein each respective central conductor portion includes a conductor width.

16. The window assembly set forth in claim 15, wherein the conductor width of each respective central conductor portion is substantially equal to a length of a highest design frequency wavelength in glass, divided by four.

17. The window assembly set forth in claim 16, wherein a first gap width for each respective first gap is less than the conductor width.

* * * * *